United States Patent
Rusconi Clerici Beltrami et al.

(10) Patent No.: US 11,668,959 B2
(45) Date of Patent: Jun. 6, 2023

(54) EYEWEAR WITH PARAMETRIC AUDIO UNIT

(71) Applicant: USound GmbH, Graz (AT)

(72) Inventors: Andrea Rusconi Clerici Beltrami, Vienna (AT); Ferruccio Bottoni, Graz (AT)

(73) Assignee: USound GmbH, Graz (AT)

( * ) Notice: Subject to any disclaimer, the term of this patent is extended or adjusted under 35 U.S.C. 154(b) by 0 days.

(21) Appl. No.: 17/540,320

(22) Filed: Dec. 2, 2021

(65) Prior Publication Data
US 2022/0179243 A1 Jun. 9, 2022

(30) Foreign Application Priority Data
Dec. 4, 2020 (DE) .................. 10 2020 132 254.2

(51) Int. Cl.
| H04R 1/00 | (2006.01) |
| --- | --- |
| G02C 5/00 | (2006.01) |
| G02C 11/00 | (2006.01) |
| H04R 1/02 | (2006.01) |
| H04R 1/28 | (2006.01) |
| H04R 1/10 | (2006.01) |

(52) U.S. Cl.
CPC .............. *G02C 11/10* (2013.01); *G02C 5/001* (2013.01); *H04R 1/028* (2013.01); *H04R 1/10* (2013.01); *H04R 1/2803* (2013.01)

(58) Field of Classification Search
CPC . H04R 1/00; H04R 1/028; H04R 1/10; H04R 1/105; H04R 1/1058; H04R 1/1066; H04R 1/1075; H04R 1/20; H04R 1/22; H04R 1/2803; H04R 1/32; H04R 1/323; H04R 1/34; H04R 1/345; H04R 1/347; G02C 11/00; G02C 11/10; G02C 5/00; G02C 5/001
See application file for complete search history.

(56) References Cited

U.S. PATENT DOCUMENTS

| 8,750,541 B1 | 6/2014 | Dong et al. | |
| --- | --- | --- | --- |
| 2007/0211574 A1* | 9/2007 | Croft, III | H04R 23/00 367/197 |
| 2014/0268016 A1 | 9/2014 | Chow et al. | |
| 2014/0270316 A1 | 9/2014 | Fan | |

(Continued)

FOREIGN PATENT DOCUMENTS

| JP | 2011 130359 A | 6/2011 |
| --- | --- | --- |
| KR | 100565202 B1 | 3/2006 |

OTHER PUBLICATIONS

German Patent Office Search Report, dated Aug. 5, 2021, 5 pages.
EPO Search Report, dated May 4, 2022, 9 pages.
EPO Examination Report, dated Jan. 18, 2023, 9 pages.

*Primary Examiner* — Thang V Tran
(74) *Attorney, Agent, or Firm* — Dority & Manning, P.A.

(57) ABSTRACT

Eyewear for outputting audio information to the wearer include an eyewear temple, which has at least one loudspeaker. The eyewear temple is configured for placement on an ear of the wearer and spaced apart from an ear opening of the wearer's ear so that the sound waves generated by the loudspeaker are transmitted over the surroundings to the spaced ear opening. The loudspeaker is an ultrasonic loudspeaker. The eyewear has a parametric audio unit that includes the ultrasonic loudspeaker and configured to generate an audible sound beam directed at the ear.

18 Claims, 2 Drawing Sheets

(56) References Cited

U.S. PATENT DOCUMENTS

| | | |
|---|---|---|
| 2015/0133716 A1 | 5/2015 | Suhami et al. |
| 2016/0057525 A1* | 2/2016 | Kappus ................ H04R 1/1058 |
| | | 381/74 |
| 2016/0142830 A1 | 5/2016 | Hu |
| 2017/0227778 A1 | 8/2017 | Osterhout |
| 2019/0051060 A1* | 2/2019 | Rapeta .................. H04R 29/00 |
| 2019/0052954 A1* | 2/2019 | Rusconi Clerici Beltrami ........... |
| | | G10K 11/175 |
| 2020/0218094 A1 | 7/2020 | Howell et al. |
| 2021/0264894 A1* | 8/2021 | Putkis .................. G10K 15/02 |

* cited by examiner

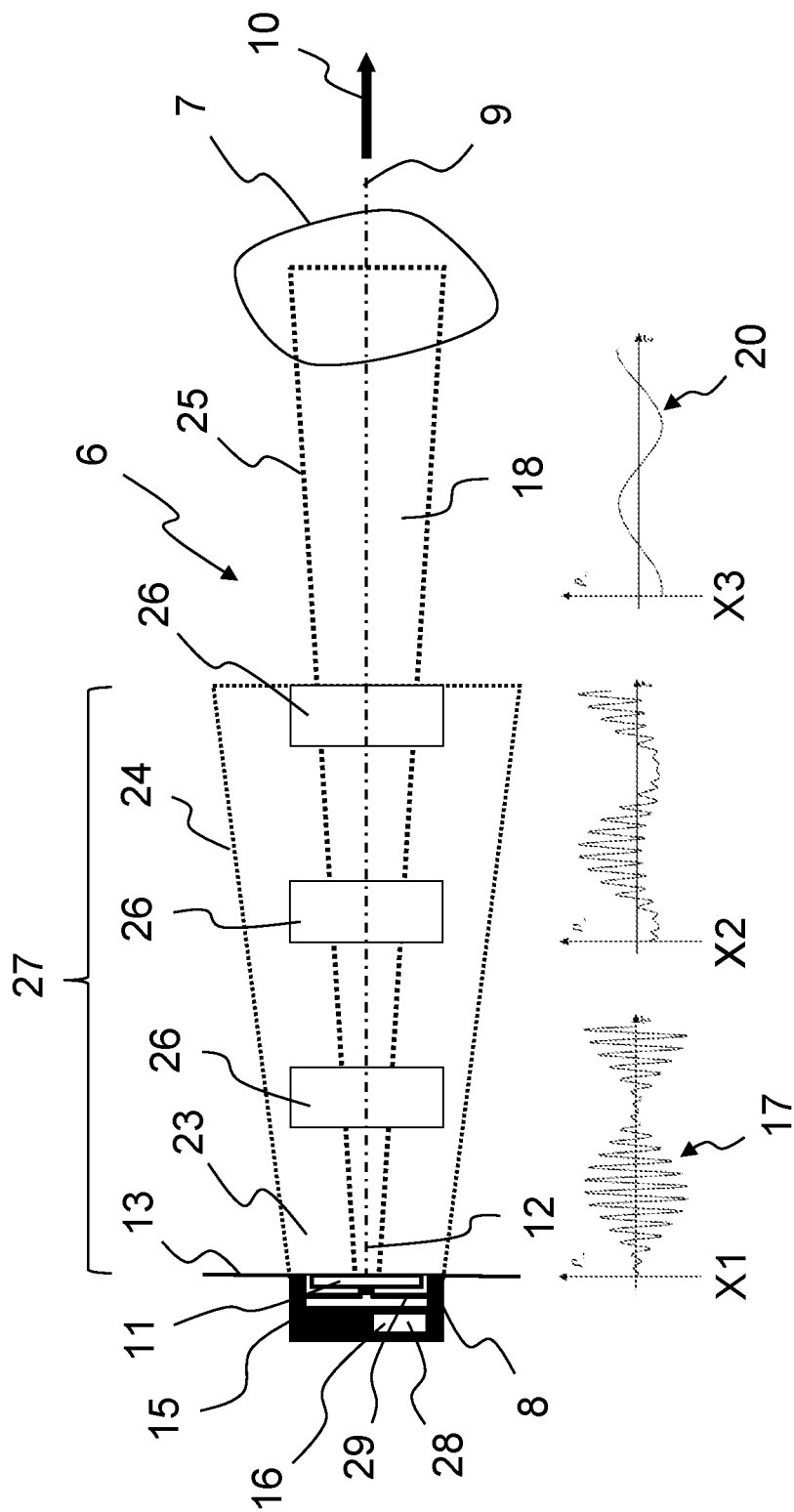

EYEWEAR WITH PARAMETRIC AUDIO UNIT

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to eyewear for outputting audio information, with an eyewear temple, which has at least one loudspeaker, wherein the eyewear temple, when placed as intended at an ear intended therefor, is spaced apart from an ear opening of the ear, and so the sound waves generated by the loudspeaker are transmitted over the surroundings to the spaced ear opening.

BACKGROUND OF THE INVENTION

Eyewear for outputting audio information are known from US 2014/0268016 A1, which is hereby incorporated herein in its entirety by this reference for all purposes, which include a loudspeaker integrated into an eyewear temple, which emits sound waves in the audible wavelength spectrum. Upon placement of the eyewear as intended, the loudspeaker is spaced apart from an ear opening of the ear of the user, and so the audible sound waves emitted from the loudspeaker must be transmitted over the surroundings to the spaced ear opening. This has the disadvantage that the transmitted audio information can be overheard by persons located in the surroundings.

US 2014/0270316 A1, which is hereby incorporated herein in its entirety by this reference for all purposes, describes eyewear that have a loudspeaker and an acoustic sound-conducting element, by means of which the sound generated by the loudspeaker can be conducted to the ear opening of a user, and so only the user can perceive this audio information. The sound-conducting element extends, starting from the temple of the eyewear, into the ear opening of the user. It is disadvantageous in this case that, due to the placement of the sound-conducting element directly at the ear opening, ambient noise can be muffled. Moreover, users perceive it to be disturbing when the audio system is arranged directly at the ear opening or in the ear opening.

EXEMPLARY OBJECTS AND SUMMARY OF THE INVENTION

The object of the present invention is to eliminate the disadvantages known from the related art, in particular to create eyewear for outputting audio information to a user without the audio information being perceptible by persons located in the surroundings, without muffling relevant ambient noise, and/or without negatively affecting the user's wearing comfort.

According to the invention, the object is achieved by means of eyewear for outputting audio information having the features described below.

The invention relates to eyewear for outputting audio information, with an eyewear temple, which has at least one loudspeaker. The eyewear temple, when placed as intended at an ear intended therefor, is spaced apart from an ear opening of the ear, and so the sound waves generated by the loudspeaker are transmitted over the ear's surroundings to the spaced ear opening. The term "surroundings" is to be understood to mean the open space that surrounds the eyewear and in which the sound can freely propagate. The eyewear therefore does not include a sound-conducting element that, starting from the temple of the eyewear, extends into the ear opening of the user. Instead, the audio information is transmitted from the eyewear indirectly over the surroundings or the ambient air to the ear opening.

The loudspeaker is designed as an ultrasonic loudspeaker. With the ultrasonic loudspeaker, sound waves in the ultrasonic range can therefore be emitted, which are not perceptible by the human ear. Preferably, the ultrasonic loudspeaker is designed in such a way that no sound waves in the audible wavelength spectrum can be emitted with the ultrasonic loudspeaker. Moreover, the eyewear has a parametric audio unit including the ultrasonic loudspeaker.

The parametric audio unit is configured to generate an audible sound beam directed at the ear, in particular at the ear opening. The audible sound beam arises from an ultrasound beam generated by the ultrasonic loudspeaker. The parametric audio unit utilizes, for this purpose, the non-linearity of the propagation of sound in air in order to generate audible sound, in particular, by means of a modulated ultrasound beam, preferably by means of a modulated radiation pressure. The highly directional sound beam generated by the parametric audio unit is essentially free from side lobes. Advantageously, audio information can therefore be transmitted from the parametric audio unit to the user in a targeted manner, without the audio information being perceptible by persons located in the proximity. Simultaneously, a very high level of customer acceptance can be achieved due to the contactless, i.e., spaced apart from the ear of the user, sound transmission and the associated high level of wearing comfort. The parametric audio unit is therefore designed for contactless sound transmission. The user does not need to wear any disturbing elements in the immediate proximity of the ear opening, since the audio information is transmitted from an region spaced apart from the ear, over the ear's surroundings in a focused manner to the ear, in particular into the ear opening. Due to the fact that disturbing elements, such as, for example, a sound-conducting element, in the immediate proximity of the ear opening are avoided, the ear opening is clear, and so ambient noise can enter the ear opening unobstructed.

It is advantageous when the parametric audio unit is configured with the capability to generate multiple virtual sources of audible sound arranged one behind the other in the sound propagation direction of the sound beam. Preferably, the parametric audio unit is designed in such a way that the virtual sources of audible sound add up in phase in the sound propagation direction. Consequently, the virtual sources of audible sound become louder in the sound propagation direction as the distance from the ultrasonic transducer increases. Outside the sound beam, the virtual sources of audible sound are out of phase with one another and destructively interfere.

Furthermore, it is advantageous when the parametric audio unit is designed in such a way that the sound beam generated by the ultrasonic loudspeaker includes a primary wave. The primary wave desirably is modulated and is preferably an ultrasonic wave. Additionally or alternatively, it is advantageous when the parametric audio unit is designed in such a way that the sound beam generated by the ultrasonic loudspeaker includes a secondary wave. Preferably, the secondary wave follows the primary wave in the sound propagation direction. Moreover, the secondary wave is preferably an audible sound wave that becomes demodulated due to air absorption. The term "audible sound" is to be understood to mean sound in the wavelength spectrum that is audible to humans. Preferably, the secondary wave arises from the primary wave, which is demodulated due to air absorption as the distance from the ultrasonic loudspeaker increases and is converted into audible sound. Consequently, the audio information is not audible in a first region adjacent to the ultrasonic loudspeaker. Yet the audio information is audible in a second region following the first region in the sound propagation direction.

It is advantageous when the primary wave has an absorption length that corresponds to a distance from the ultrasonic loudspeaker, within which the primary wave and/or the ultrasound of the sound beam is absorbed by the air. Due to molecular friction and other molecular properties, a portion of the acoustic energy of the sound beam is absorbed on the way through the air. Higher frequencies, such as ultrasound, are absorbed to a considerably greater extent than low frequencies, such as audible sound. In the case of a sound propagation in the sound propagation direction, the primary wave and/or the ultrasound of the sound beam are/is therefore absorbed continuously and essentially completely by the air over the absorption length, whereas the secondary wave and/or the audible sound have/has a greater range over the absorption length.

In this regard, it is advantageous when, provided the eyewear temple is placed as intended, the absorption length of the primary wave is less than or equal to a distance between the ultrasonic loudspeaker and the ear opening, wherein the absorption length is, in particular, less than or equal to 6 cm, 5.5 cm, 5 cm, 4.5 cm, 4 cm, 3.5 cm, 3 cm, 2.5 cm, 2 cm, 1.5 cm, or 1 cm. As a result, it can be ensured that the modulated primary wave and/or the modulated ultrasonic wave are/is sufficiently strongly demodulated into audible sound at a distance at which the ear opening is located, and so the demodulated audible sound is present in the area of the ear opening and can be perceived by the user.

It is advantageous when the parametric audio unit includes a modulator, in particular an audio signal modulator, with which a modulated ultrasonic signal is generatable for the ultrasonic loudspeaker.

Preferably, the modulated ultrasonic signal is modulated in such a way that the primary wave, the virtual sources of audible sound, and/or the secondary wave are/is generatable. Additionally or alternatively, the modulated ultrasonic signal is modulated in such a way that the modulated ultrasound generated, with the aid of the modulated ultrasonic signal, and emitted by the ultrasonic loudspeaker is demodulated into audible sound as the distance from the ultrasonic loudspeaker increases and/or due to the air absorption.

Furthermore, it is advantageous when the modulated ultrasonic signal is designed in such a way that the modulated ultrasonic signal or the sound wave generated with this ultrasonic signal is demodulated into audible sound in the sound propagation direction as the distance from the ultrasonic loudspeaker increases due to the non-linearity of the propagation of sound in air and/or due to the air absorption.

Likewise it is advantageous when the modulator is designed in such a way that the modulator modulates an ultrasonic carrier signal, in particular an amplitude of the ultrasonic carrier signal, on the basis of an audio signal. The audio signal is an audible sound signal and/or the audio information to be transmitted to the user.

It is also advantageous when the parametric audio unit includes a signal source, which provides the audio signal to the modulator, and/or includes an oscillator, which provides the ultrasonic carrier signal to the modulator.

It is also advantageous when the parametric audio unit includes at least one filter, in particular a high-pass filter and/or a low-pass filter, for filtering the audio signal.

Furthermore, it is advantageous when the parametric audio unit includes at least one dynamic compressor for reducing a fluctuation range of the, in particular filtered, audio signal.

In an advantageous enhanced embodiment, it is advantageous, furthermore, when the parametric audio unit includes an amplifier for amplifying the modulated ultrasonic signal.

Likewise it is advantageous when the ultrasonic loudspeaker is a, preferably piezoelectric, MEMS sound transducer for generating ultrasound.

Moreover, it is advantageous when the ultrasonic loudspeaker has a sound beam axis, along which the sound beam is emittable in the sound propagation direction. Furthermore, it is advantageous when the ultrasonic loudspeaker is arranged at the eyewear temple in such a way that the sound beam of the ultrasonic loudspeaker propagating along the sound beam axis is directed toward the ear opening when the eyewear temple is placed as intended. As a result, it is ensured that the ultrasonic loudspeaker emits directly into the ear opening and, consequently, essentially no audio information can be overheard by persons located in the surroundings.

It is also advantageous when the ultrasonic loudspeaker includes at least one sound-generating element, which is deflectable in the direction of a stroke axis, for generating ultrasound. The sound-generating element can preferably be an, in particular piezoelectric, cantilever arm, which is preferably attached at a support substrate with only one of its two ends, and so the other end can freely oscillate. Additionally or alternatively, the sound-generating element is designed as a rigid stroking plate, which can be deflected with respect to the perpendicular stroke axis.

In an advantageous enhanced embodiment of the invention, the stroke axis of the sound-generating element is arranged in parallel and/or concentrically to the sound beam axis of the ultrasonic loudspeaker.

It is advantageous when the ultrasonic loudspeaker includes a plurality of adjacently arranged sound-generating elements. These preferably form a common sound-generating area of the ultrasonic loudspeaker.

It is advantageous when the ultrasonic loudspeaker, in particular its sound-generating element, is arranged at an outer side of the eyewear temple, in particular on the outer side or in an outer-side recess of the outer side. Additionally or alternatively, it is advantageous when the ultrasonic loudspeaker, in particular its sound-generating element, is arranged in a planar or flush manner with respect to the outer side.

It is advantageous when the parametric audio unit has an electronic chip, in particular an ASIC, which includes the modulator, filter, dynamic compressor, and/or amplifier.

It is advantageous when the electronic chip is embedded in the support substrate of the MEMS sound transducer. The term "embedded" is to be understood to mean that the electronic chip is surrounded by the carrier substrate completely, i.e., on all sides.

The invention relates to a parametric audio unit use in eyewear according to the preceding description, wherein the mentioned features can be present individually or in any combination.

BRIEF DESCRIPTION OF THE DRAWINGS

The accompanying drawings, which are incorporated in and constitute a part of this specification, illustrate at least one presently preferred embodiment of the invention as well as features applicable to some alternative embodiments. These drawings, together with the written description, explain the principles of the invention but by no means are intended to be exhaustive of every possible embodiment of the invention. A full and enabling disclosure of the present invention is set forth more particularly in this specification, including reference to the accompanying figures, in which:

FIG. 2 shows a detailed view of the parametric audio unit.

DETAILED DESCRIPTION OF EXEMPLARY EMBODIMENTS OF THE INVENTION

Figure 1:
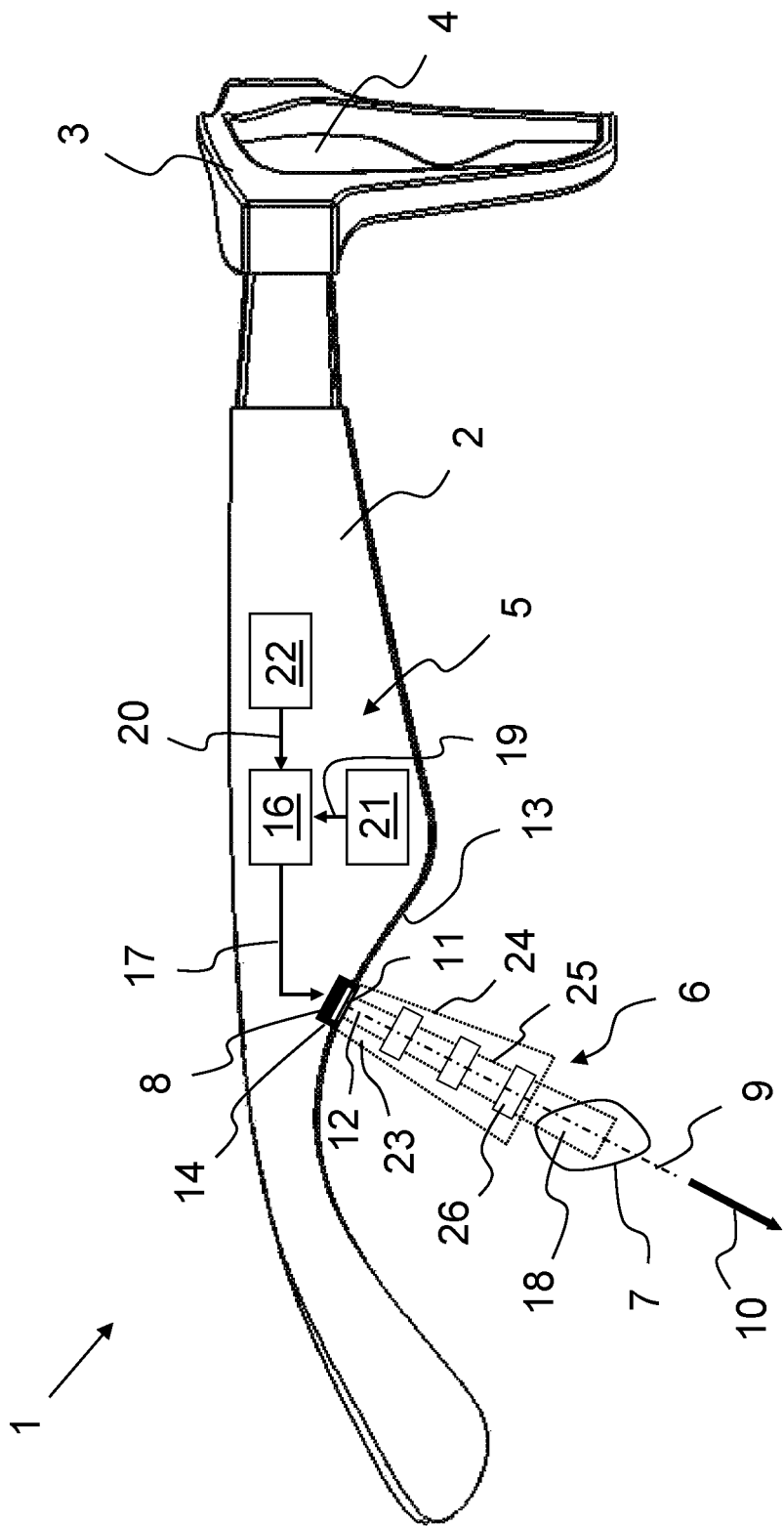
FIG. 1 shows a schematic side view of eyewear for outputting audio information, including a parametric audio unit.

Reference now will be made in detail to present exemplary embodiments of the invention, wherein one or more examples of which are illustrated in the accompanying drawings. The detailed description uses numerical and/or letter designations to refer to features in the drawings. Like or similar designations in the drawings and description have been used to refer to like or similar parts of the embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 1200 also includes all possible sub-ranges, examples of which are from 100 to 150, 170 to 190, 153 to 162, 145.3 to 149.6, and 187 to 1200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

FIG. 1 shows a side view of eyewear 1 for outputting audio information. The eyewear 1 includes two eyewear temples 2, which are arranged at a support frame 3 for the lenses 4. In the side view represented in FIG. 1, only one of the two eyewear temples 2 is visible. The eyewear 1 is designed as audio eyewear. The eyewear temples 2, when placed as intended at an ear of a user intended therefor, are arranged spaced apart from an ear opening 7 of the user (not shown) wearing the eyewear 1. Consequently, the audio information must be transmitted over region that constitutes the open surroundings to the spaced ear opening 7.

In order to output the audio information, the eyewear 1 includes a parametric audio unit, which is schematically represented in FIG. 1 and given the general numerical designation 5. The term "parametric" means, in particular, that the audio unit 5 extracts parameters from an audio signal 20, in particular an amplitude of the signal, and/or uses these parameters to generate an audible sound beam, which is schematically represented in FIG. 1 and given the general numerical designation 6. As explained in detail in the following description, the parametric audio unit 5 is configured with the capability of generating the audible sound beam 6. As schematically depicted according to FIG. 1, this sound beam 6 is directed toward an ear of a user when the eyewear 1 is placed at the head of the user as intended. The ear opening 7 of the ear is schematically represented in FIG. 1. The sound beam 6 is directed toward this ear opening 7 of the ear when the eyewear 1 is placed as intended to be worn by the user. Consequently, the audio information is transmitted to the ear in a targeted manner, and so persons located in the surroundings cannot overhear the audio information.

Moreover, the parametric audio unit 5 is designed to be contactless, which means that there are not any physical sound transmission elements disposed between the parametric audio unit 5 and the ear of the user. Instead, the audio information is freely transmitted over the surroundings. The term "surroundings" is to be understood to refer to the air surrounding the eyewear 1 and the ear and the air located outside the parametric audio unit 5.

Advantageously, the eyewear 1 is distinguished by a high level of wearing comfort, since no sound-conducting, physical elements are arranged on the auricle or in the ear opening 7. This fact has the further advantage that the ear opening 7 is not blocked, and so exterior noise, such as, for example, vehicles driving past the user, can be auditorily perceived.

According to FIG. 1, the parametric audio unit 5 includes an ultrasonic loudspeaker 8, which generates the sound beam 6. In FIG. 2, the ultrasonic loudspeaker 8 and the sound beam 6 generated thereby are schematically represented once again in a detailed view.

The ultrasonic loudspeaker 8 has a sound beam axis 9. Along this sound beam axis 9, the ultrasonic loudspeaker 8 is configured with the capability to emit ultrasonic waves in a sound-generating direction 10, which is directed away from the eyewear temple 2. As is apparent from FIG. 1, the ultrasonic loudspeaker 8 is configured and disposed in the eyewear temple 2 in such a way that the sound beam 6 propagating along the sound beam axis 9 in the sound-generating direction 10 is directed toward the ear opening 7 when the eyewear temple 2 is placed in the as intended to be worn.

In order to generate the ultrasound, the ultrasonic loudspeaker 8 includes at least one sound-generating element 11, which can be deflected to and fro along a stroke axis 12. In the present exemplary embodiment, the sound-generating element 11 is designed as a rigid plate, which extends parallel to a plane that is oriented perpendicularly to the stroke axis 12. The stroke axis 12 of the sound-generating element 11 is arranged in parallel and/or concentrically to the sound beam axis 9 of the ultrasonic loudspeaker 8.

According to the present exemplary embodiment, the ultrasonic loudspeaker 8 and/or its sound-generating element 11 are/is arranged at the eyewear temple 2 in such a way that the sound-generating element 11 can transmit its sound waves directly into the surroundings. For this purpose, the ultrasonic loudspeaker 8, in particular its sound-generating element 11, is arranged at an outer side 13 of the eyewear temple 2. The ultrasonic loudspeaker 8, in particular its sound-generating element 11, can be arranged directly on the outer side 13 and/or in an outer-side recess 14 of the eyewear temple 2. In this context, it is advantageous, furthermore, when the ultrasonic loudspeaker 8, in particular its sound-generating element 11, is arranged in a planar or flush manner with respect to the outer side 13 of the eyewear temple 2.

In the present case, the ultrasonic loudspeaker 8 is designed as a MEMS sound transducer for generating ultrasound. As schematically shown in FIG. 2, the ultrasonic loudspeaker 8 includes a support substrate 15, with respect to which the sound-generating element 11 can be deflected along the stroke axis 12. In an embodiment as depicted in FIG. 2, the MEMS sound transducer includes a piezoelectric actuator 29, which is coupled to the sound-generating element 11. Alternatively, as schematically shown in FIG. 1, a piezoelectric actuator could be designed as, or integrated into, the sound-generating element 11.

According to FIG. 1, the parametric audio unit 5 includes a modulator 16. By means of the modulator 16, the parametric audio unit 5 can generate a modulated ultrasonic signal 17, with which the ultrasonic loudspeaker 8 can be actuated to generate ultrasound 23. The modulator 16 is preferably designed as a chip 28. According to FIG. 2, this chip 28 is preferably embedded into the support substrate 15.

The modulated ultrasonic signal 17 is modulated in such a way that the ultrasound 23 generated by the ultrasonic loudspeaker 8 is absorbed by the air the farther away it moves from the ultrasonic loudspeaker 8 in the sound propagation direction 10 and, as a result, is converted into audible sound 18 and/or demodulated. Accordingly, the parametric audio unit 5 utilizes the non-linearities of the propagation of sound in air in order to generate audible sound by means of the modulated ultrasound beam.

According to FIG. 1, the modulator 16 utilizes an ultrasonic carrier signal 19 and the audio signal 20 including the audio information to generate the modulated ultrasonic signal 17. The ultrasonic carrier signal 19 is provided to the modulator 16 by an oscillator 21. Furthermore, the parametric audio unit 5 includes a signal source 22, which provides the audio signal 20 to the modulator 16. The signal source 22 desirably is an electrical component or unit, e.g., a memory with a mp3 file and an electronic chip configured with the capability for playing the mp3 file. When the chip plays the mp3 file, then the signal source 22 provides an audio signal 20.

The modulator 16 is designed in such a way that it modulates the ultrasonic carrier signal 19 on the basis of the audio signal 20 in such a way that, in particular under consideration of the air absorption and/or the non-linearities of the propagation of sound in air, the ultrasonic wave emitted by the ultrasonic loudspeaker 8 is demodulated into audible sound 18 and/or into a source of audible sound— preferably at a defined distance from the ultrasonic loudspeaker 8—, which reproduces the audio information of the audio signal 20. For this purpose, the modulator 16 modulates, in particular, an amplitude of the ultrasonic carrier signal 19 with the audio signal 20.

As is apparent from FIG. 1 and FIG. 2, the ultrasonic loudspeaker 8 actuated with the modulated ultrasonic signal 17 generates the sound beam 6. The sound beam 6 includes a primary wave 24 and a secondary wave 25. The primary wave 24 is an ultrasound beam with non-linear interaction. The secondary wave 25 is an audible sound beam. The sound beam 6 includes multiple virtual sources of audible sound 26, which, in particular, are formed on the basis of the primary wave 24 and/or are arranged one behind the other in the sound propagation direction 10. These add up in phase in the sound propagation direction 10, and so the virtual sources of audible sound 26 become louder as the distance from the ultrasonic loudspeaker 8 increases. In this way, the ultrasonic wave and the source of audible sound excited thereby, propagate at the same sound velocity, and so all elementary waves are in phase in the sound propagation direction 10, which results in a constructive superposition of the individual audio elementary waves in the sound propagation direction 10. However, in directions other than the sound propagation direction 10, this phase relation of constructive superposition does not exist. Accordingly, these elementary waves in directions other than the sound propagation direction 10 are destructively superimposed. As a result, the strong directivity of the secondary wave 25 and/or of the audible sound wave is achieved.

As is clear, in particular, from FIG. 2, the primary wave 24 has an absorption length 27. The absorption length 27 describes the length of the non-linear interaction section in the propagation direction of the primary wave 24 and/or of the primary ultrasound beam. Within this absorption length 27, the primary wave 24 is absorbed by the air and/or as a result, the secondary wave 25 and the audible sound 18 are generated beyond the absorption length 27. It is advantageous when, as represented in FIG. 1, in particular, the absorption length 27 of the primary wave 24 is less than or equal to a distance between the ultrasonic loudspeaker 8 and the ear opening 7. As a result, it can be ensured that the ultrasound 23 has been converted into audible sound 18 before it impacts the ear opening 7.

In FIG. 2, the self-demodulation of a single modulated oscillation progressing with the distance from the ultrasonic loudspeaker 8 is illustrated schematically on the basis of the temporal profiles of the wave shapes by way of example for three difference distances X1, X2, and X3. The sound pressure p is shown on the Y-Axis of the temporal profiles in FIG. 2, and the time T is shown on the X-Axis. In the first distance X1, the sound wave generated by the ultrasonic loudspeaker 8 is characterized by the modulated ultrasonic signal 17. The modulated carrier wave of the ultrasonic carrier signal 19 is still clearly apparent. As the distance increases, the self-demodulation results, within the absorption length 27, at a greater second distance X2, in a superposition of the modulated ultrasonic signal and/or the ultrasonic carrier signal 19 with the audio signal 20. As the distance continues to increase, the ultrasonic wave and/or the ultrasonic carrier signal 19 finally undergoes a considerably greater damping than the audible sound wave and finally disappears upon exceedance of the absorption length 27, and so, exclusively, the audio signal 20 is detectable at a distance X3.

While at least one presently preferred embodiment of the invention has been described using specific terms, such description is for illustrative purposes only. It is to be understood that changes and variations may be made without departing from the spirit or scope of the following claims. This written description uses examples to disclose the invention, and also to enable any person skilled in the art to practice the invention, including making and using any devices or systems and performing any incorporated methods. The patentable scope of the invention is defined by the claims, and may include other examples that the present disclosure puts into the possession of those skilled in the art. Such other examples are intended to be within the scope of the claims if they include structural elements that do not differ from the literal language of the claims, or if they include equivalent structural elements with insubstantial differences from the literal language of the claims.

LIST OF REFERENCE NUMBERS

1 eyewear
2 eyewear temple
3 support frame 4 lenses
5 parametric audio unit
6 sound beam
7 ear opening
8 ultrasonic loudspeaker
9 sound beam axis
10 sound-generating direction
11 sound-generating element
12 stroke axis
13 outer side
14 outer-side recess
15 support substrate
16 modulator
17 modulated ultrasonic signal
18 audible sound
19 ultrasonic carrier signal
20 audio signal
21 oscillator
22 signal source
23 ultrasound
24 primary wave
25 secondary wave
26 virtual sources of audible sound
27 absorption length
28 chip
29 piezoelectric actuator
X1 first distance
X2 second distance
X3 third distance

What is claimed is:

1. Eyewear for outputting audio information to the ear of the wearer of the eyewear, the eyewear comprising:
   an eyewear temple defining an ear section configured to be worn spaced apart from an ear opening of the wearer;
   an ultrasonic loudspeaker held in the ear section of the eyewear temple;
   a parametric audio unit electrically connected to the ultrasonic loudspeaker;
   wherein the eyewear temple is configured so that when the eyewear temple is placed as intended at the wearer's ear, then the ear section is spaced apart from the ear opening and disposed so that the sound waves generated by the ultrasonic loudspeaker are transmitted over the ear's surroundings to the ear opening;
   wherein the parametric audio unit is configured to generate via the ultrasonic loudspeaker, an audible sound beam directed in a sound propagation direction toward the wearer's ear opening; and
   wherein the parametric audio unit is configured to generate multiple virtual sources of audible sound arranged one behind the other in the sound propagation direction of the sound beam and add up in phase in the sound propagation direction.

2. The eyewear of claim 1, wherein the parametric audio unit includes an electronic chip in the form of an ASIC, wherein the electronic chip includes a modulator that is configured to modulate an ultrasonic signal from the ultrasonic loudspeaker in a way that produces at least one of the multiple virtual sources of audible sound, a primary wave, and a secondary wave.

3. The eyewear of claim 1, wherein the parametric audio unit includes a modulator that is configured to modulate an ultrasonic signal from the ultrasonic loudspeaker in a way that produces at least one of the multiple virtual sources of audible sound, a primary wave, and a secondary wave.

4. The eyewear of claim 3, wherein the modulator is configured in such a way that the modulated ultrasonic signal becomes demodulated due to air absorption into audible sound in the sound propagation direction with increasing distance from the ultrasonic loudspeaker.

5. The eyewear of claim 3, wherein the modulator is configured to modulate an amplitude of an ultrasonic carrier signal on the basis of an audio signal.

6. The eyewear of claim 5, wherein the parametric audio unit includes a signal source, which provides the audio signal to the modulator.

7. The eyewear of claim 5, wherein the parametric audio unit includes an oscillator, which provides the ultrasonic carrier signal to the modulator.

8. The eyewear of claim 5, wherein the parametric audio unit includes at least one filter configured for filtering the audio signal to become a filtered audio signal, and at least one dynamic compressor configured for reducing a fluctuation range of the filtered audio signal.

9. The eyewear of claim 3, wherein the parametric audio unit includes an amplifier for amplifying the modulated ultrasonic signal.

10. The eyewear of claim 1, wherein the parametric audio unit is configured to generate the sound beam by the ultrasonic loudspeaker to include a primary wave and a secondary wave following the primary wave in the sound propagation direction, which is demodulated due to air absorption.

11. The eyewear of claim 10, wherein when the eyewear temple is placed as intended at the wearer's ear, then an absorption length of the primary wave is less than or equal to a distance between the ultrasonic loudspeaker and the ear opening, wherein the absorption length is less than or equal to 2 cm.

12. The eyewear of claim 1, wherein the ultrasonic loudspeaker is a piezoelectric, MEMS sound transducer for generating ultrasound.

13. The eyewear of claim 1, wherein the ultrasonic loudspeaker is configured to define a sound beam axis, along which the sound beam is emittable in the sound propagation direction, and the ultrasonic loudspeaker is arranged at the eyewear temple in such a way that the sound beam of the ultrasonic loudspeaker propagating along the sound beam axis is directed toward the ear opening when the eyewear temple is placed as intended at the wearer's ear.

14. The eyewear of claim 13, wherein the ultrasonic loudspeaker includes at least one sound-generating element, which is deflectable in the direction of a stroke axis, for generating ultrasound, and wherein the stroke axis of the sound-generating element is arranged in parallel to the sound beam axis of the ultrasonic loudspeaker.

15. The eyewear of claim 13, wherein the ultrasonic loudspeaker includes at least one sound-generating element, which is deflectable in the direction of a stroke axis, for generating ultrasound and/or in that the stroke axis of the sound-generating element is arranged concentrically to the sound beam axis of the ultrasonic loudspeaker.

16. The eyewear of claim 13, wherein the sound-generating element of the ultrasonic loudspeaker is arranged at an outer side of the eyewear temple in an outer-side recess.

17. The eyewear of claim 13, wherein the sound-generating element of the ultrasonic loudspeaker is arranged at an outer side of the eyewear temple in a planar manner with respect to the outer side.

18. Eyewear for outputting audio information to the ear of the wearer of the eyewear, the eyewear comprising:

an eyewear temple defining an ear section configured to be worn spaced apart from an ear opening of the wearer;

an ultrasonic loudspeaker held in the ear section of the eyewear temple:

a parametric audio unit electrically connected to the ultrasonic loudspeaker;

wherein the eyewear temple is configured so that when the eyewear temple is placed as intended at the wearer's ear, then the ear section is spaced apart from the ear opening and disposed so that the sound waves generated by the ultrasonic loudspeaker are transmitted over the ear's surroundings to the ear opening;

wherein the parametric audio unit is configured to generate via the ultrasonic loudspeaker, an audible sound beam directed in a sound propagation direction toward the wearer's ear opening;

wherein the parametric audio unit is configured to generate the sound beam by the ultrasonic loudspeaker to include a primary wave and a secondary wave following the primary wave in the sound propagation direction, which is demodulated due to air absorption; and wherein when the eyewear temple is placed as intended at the wearer's ear, then an absorption length of the primary wave is less than or equal to a distance between the ultrasonic loudspeaker and the ear opening, wherein the absorption length is less than or equal to 5 cm.

* * * * *